US011500703B1

United States Patent
Wei et al.

(12)

(10) Patent No.: US 11,500,703 B1
(45) Date of Patent: Nov. 15, 2022

(54) PROCESSING CONCURRENT MESSAGE SEQUENCES

(71) Applicant: INTERNATIONAL BUSINESS MACHINES CORPORATION, Armonk, NY (US)

(72) Inventors: Jing Jing Wei, Beijing (CN); Yue Wang, Beijing (CN); Jia Lin Wang, Beijing (CN); Yi Fan Wu, Beijing (CN); Qi Han Zheng, Beijing (CN); Bing Ding, Beijing (CN); Jun Ying Lu, Beijing (CN); Haitao Wang, Chaoyang (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/498,837

(22) Filed: Oct. 12, 2021

(51) Int. Cl.
   *G06F 9/54* (2006.01)
   *G06F 9/50* (2006.01)

(52) U.S. Cl.
   CPC ............ *G06F 9/546* (2013.01); *G06F 9/5061* (2013.01)

(58) Field of Classification Search
   CPC ................................ G06F 9/542; G06F 9/546
   USPC .................................................. 719/313, 318
   See application file for complete search history.

(56) References Cited

U.S. PATENT DOCUMENTS

| 9,917,913 B2* | 3/2018 | Qin ........................ H04L 67/55 |
| 10,409,650 B2* | 9/2019 | Zhao ..................... G06F 9/5083 |
| 10,831,619 B2* | 11/2020 | Park .................... G06F 11/1658 |

FOREIGN PATENT DOCUMENTS

CN     1 11158931 A     5/2020

OTHER PUBLICATIONS

Knative Eventing Broker, Retrieved from Internet: https://knative.dev/docs/eventing/samples/sequence/sequence-terminal/. Retrieved on Aug. 16, 2021, 5 pages.
Liberty embedded JMS messaging provider, WebSphere Application Server Liberty, Retrieved from Internet: https://www.ibm.com/docs/en/was-liberty/base?topic=providers-embedded-jms-messaging-provider, Retrieved on Aug. 17, 2021, 5 pages.

(Continued)

*Primary Examiner* — Andy Ho
(74) *Attorney, Agent, or Firm* — Schmeiser, Olsen & Watts, LLP; Christopher Pignato

(57) ABSTRACT

A method, computer program product, and computer system for processing instances of message sequences. Two or more instances are received. Each instance has an instance number and an associated instance Id. Each instance includes a stream of one or more messages. Each message in each stream is associated with a respective task. All messages in the two or more instances whose respective tasks have been completed are distributed into partitions in the broker. Different messages in each instance of at least one instance are distributed into different partitions. The messages distributed in the partitions include parallel task messages. The parallel task messages are sequenced by being grouped by the instance number or instance Id and are sequentially ordered in each group in an ascending order of a timestamp of arrival of each parallel task message at the broker. The parallel task messages in each instance are dispatched to a service.

20 Claims, 11 Drawing Sheets

(56) References Cited

OTHER PUBLICATIONS

Rob Parker, Published on Nov. 6, 2019, Certified container scaling part 1: The fixed deployment, Retrieved from Internet: https://community.ibm.com/community/user/imwuc/viewdocument/certified-container-scaling-part-1?CommunityKey=b382f2ab-42fW932-aa8b-8786ca722d55, Retrieved on Aug. 16, 2021, 9 pages.

Chris Munns, Oct. 2, 2020, Implementing FIFO message ordering with Amazon MQ for Apache ActiveMQ, https://aws.amazon.com/blogs/compute/implementing-fifo-message-ordering-with-amazon-mq-for-apache-activemq/, 9 pages.

Jun Rao, Mar. 12, 2015, How to choose the number of topics/partitions in a Kafka cluster? https://www.confluent.io/blog/how-choose-number-topics-partitions-kafka-cluster/, 5 pages.

By piotr.minkowski, Mar. 12, 2021, Knative Eventing with Kafka and Spring Cloud, https://piotrminkowski.com/2021/03/12/knative-eventing-with-kafka-and-spring-cloud/, 14 pages.

Method for sustaining order previously defined by source application in Apache Kafka [P], IPCOM/000255540D, Publication Date Oct. 1, 2018, IP.com PAD, 2 pages.

Kamil Charlampowicz, Aug. 27, 2019, Does Kafka really guarantee the order of messages? https://blog.softwaremill.com/does-kafka-really-guarantee-the-order-of-messages-3ca849fd19d2, 6 pages.

Felipe Dutra Tine e SILVA, Feb. 3, 2018, Kafka: Ordering Guarantees, https://medium.com/@felipedutratine/kafka-ordering-guarantees-99320db8f87f, 5 pages.

Adam Zegelin, A Visual Understanding to Ensuring Your Kafka Data is (Literally) in Order, https://www.instaclustr.com/a-visual-understanding-to-ensuring-your-kafka-data-is-literally-in-order/, Mar. 11, 2020, 15 pages.

Mell, Peter et al.; "The NIST Definition of Cloud Computing;" National Institute of Standards and Technology; Special Publication 800-145; Sep. 2011; 7 pages.

Liberty embedded JMS messaging provider, WebSphere Application Server Liberty/ base /, Retrieved from Internet Jan. 14, 2022: https://www.ibm.com/docs/en/was-liberty/base?topic=providers-embedded-jms-messaging-provider, last updated Dec. 2, 2021, 5 pages.

\* cited by examiner

PROCESSING CONCURRENT MESSAGE SEQUENCES

BACKGROUND

Knative eventing is a system that is designed to address a common need for cloud native development and provides composable primitives to enable late-binding event sources and event consumers.

FIG. 1 depicts an event flow in Knative eventing, in accordance with the prior art.

A broker 120 receives a plurality of events 140 (also called "messages") as a stream of events from one or more event senders 110 (also called "publishers" or "producers"). The event senders 110 can submit the events 140 to the broker 120 by POSTing the events 140 to the broker's status.address.url.

The words "event" and "message" have the same meaning and are interchangeable.

The broker 120 may dispatch the events 140, or a subset of the events 140 determined via filtering, to subscribers 130 (also called "consumers" or "sinks"). The subscriber 130 may be a service.

The events 140 received by the broker 120 can be selectively filtered by event attribute(s) via one or more triggers 150. Each trigger 150 describes a filter on one or more event attributes of the events 140 to determine which events of the events 140 should be removed, leaving selected events (i.e., the remaining events) to be dispatched to the subscriber 130.

The broker 120 may directly deliver or dispatch, via direct path 160, the events 140 to the addressable subscribers 130 without filtering.

FIG. 2 depicts an architecture 200 for Knative eventing, in accordance with the prior art.

The architecture 200 comprises an Administrator ("Admin") 205, a K8s master 210, a Knative eventing structure 220, and a service 230. "K8s" results from replacing the eight letters of "ubernete" in "Kubernates" with the digit 8.

The admin 205 interacts 206 with the K8s master 210 to deploy a process.

The K8s master 210 includes an application programming interface (API) 212, a controller manager 214, and an etcd 216.

The Knative eventing structure 220 includes a broker 240.

The broker 240 includes a receiver 250, a Kafka event streaming platform 260, a dispatcher 270, and a controller 280.

The Kafka event streaming platform 260 includes a topic 261 organized into partitions. Although only two partitions (partition 1 and partition 2) are shown explicitly in FIG. 2, the partitions 1 and partition 2 collectively represent a plurality of partitions (e.g., 2 partitions, 3 partitions, 4 partitions, etc.).

In the broker 240, the receiver 250 receives the stream of events and distributes 291 the events into the plurality of partitions represented by partitions 1 and 2, wherein each event is placed in only one partition of the plurality of partitions. For each event, a Kafka protocol determines into which partition each event is placed. The dispatcher 270 interacts 292 with the plurality of partitions and extracts the events from the plurality of partitions, and then dispatches 293 the events to the service 230 under control of the controller 280.

The service 230 may include a container 231 that packages runtime code for processing the events received 293 from the dispatcher 270 of the broker 240.

In the service 230, the runtime code in the container 231 processes the events received from the dispatcher 270.

In the K8s master 210: (i) the etcd 216 stores parameters (e.g., configuration data, state data, metadata, etc.) pertinent to the Knative Eventing structure 220, wherein the parameters may be received 295 by the etcd 216 from the controller 280; (ii) the controller manager 214 manages and coordinates the K8s master and provides 294 to the controller 280 constraints pertaining to dispatching the events to the service 230; and (iii) the API 212 provides a programming interface between the K8s master 210 and worker nodes or external nodes (e.g., servers, virtual machines, etc.).

The following example of a candidate nomination process illustrates a problem with the existing state of Kafka eventing technology.

In this example, 3 managers will nominate 2 employees as candidates for being trained and a total of 5 candidates of the nominated candidates will be trained, leaving one nominated candidate who will not be trained. Given a nomination rule of first in, first out (FIFO), the following sequence of events occur: (i) a nomination request is sent (e.g., by the system) to each manager; (ii) each manager nominates 2 candidates; and (iii) the system generates a training list of nominated candidates who will be trained.

The preceding nomination sequence impacts generation of a training list of candidates to be trained. If the preceding sequence of events is not implemented in accordance with the FIFO rule, an incorrect training list of nominated candidates will result.

In a broker is implemented by Kafka, there are two partitions (i.e., Partition 1 and Partition 2) depicted in Table 1.

TABLE 1

| Partition 1 | Message Id: S_2_2_1<br>Instance Id: I2,<br>Task name: manager M1 nominates 2 candidates,<br>Timestamp: T_2_2_1 |
|---|---|
| Partition 1 | Message Id: S_2_2_2<br>Instance Id: I2,<br>Task name: manager M2 nominates 2 candidates,<br>Timestamp: T_2_2_2 |
| Partition 2 | Message Id: S_2_2_3<br>Instance Id: I2,<br>Task name: manager M3 nominates 2 candidates<br>Timestamp: T_2_2_3 |

Each manager (M1, M2, M3) nominates 2 candidates and send nomination messages (S_2_2_1; S_2_2_2; and S_2_2_3) to the Kafka event streaming platform 260. The three nomination messages go into the two different partition as shown in Table 1.

Partition 2 delivers messages faster than Partition 1, so that manager M3's 2 nominated candidates will be erroneously accepted for training before the nominated candidates of managers M1 and M2 will be considered for training.

Consequently, the 5 candidates to be trained are manager M3's 2 nominated candidates, manager M1's 2 nominated candidates, and one nominated candidate of manager M2's 2 nominated candidates which is incorrect based on the FIFO rule in consideration of the Timestamps shown in Table 1.

The correct result, which is not achieved, is that the 5 candidates who should be trained are manager M1's 2 nominated candidates, manager M2's 2 nominated candidates, and one nominated candidate of manager M3's 2 nominated candidates.

Therefore, the current technology can guarantee implementation of the FIFO rule if only one partition is used but without high availability and with low processing capability, and the current technology cannot guarantee a correct implementation of the FIFO rule if multiple partitions are used.

SUMMARY

Embodiments of the present invention provide a method, a computer program product and a computer system, for processing instances of message sequences.

One or more processors of a broker within a Knative eventing structure, receive a plurality of messages, wherein messages belong to different instances, each instance has an instance number and an associated instance Id, wherein each instance comprises a stream of one or more messages, wherein each message in each stream is associated with a respective task, wherein some instances consists of a plurality of messages whose respective tasks have been completed and were executed in parallel, and wherein the broker comprises a Kafka event streaming platform that includes a plurality of partitions.

The one or more processors distribute, into the plurality of partitions, all messages in the plurality of instances whose respective tasks have been completed, wherein different messages in each instance of at least one instance of the at least two instances are distributed into different partitions of the plurality of partitions, and wherein the messages distributed in the plurality of partitions comprise a plurality of parallel task messages.

The one or more processors sequence the parallel task messages by having the parallel task messages grouped by the instance number or instance Id and sequentially ordered in each group in an ascending order of a timestamp of arrival of each parallel task message at the broker The one or more processors dispatch the parallel task messages in each instance to a service in a time sequence governed by the sequential ordering of the parallel task messages in each group, which dispatches the parallel task messages according to a first in, first out (FIFO) requirement.

DETAILED DESCRIPTION

Figure 1:
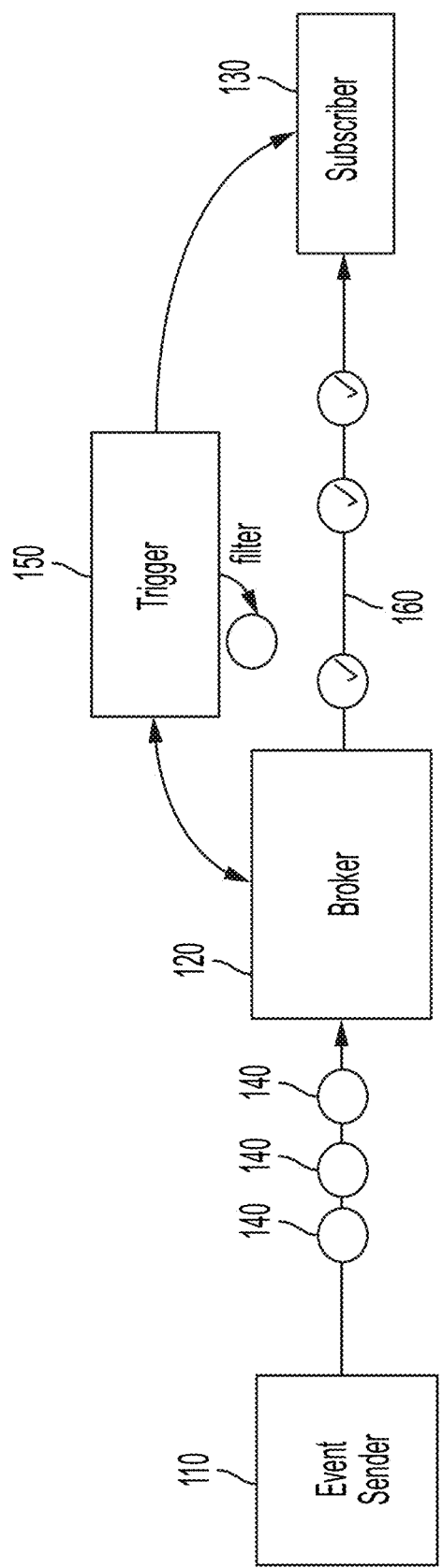
FIG. 1 depicts an event flow in Knative eventing, in accordance with the prior art.
Figure 2:
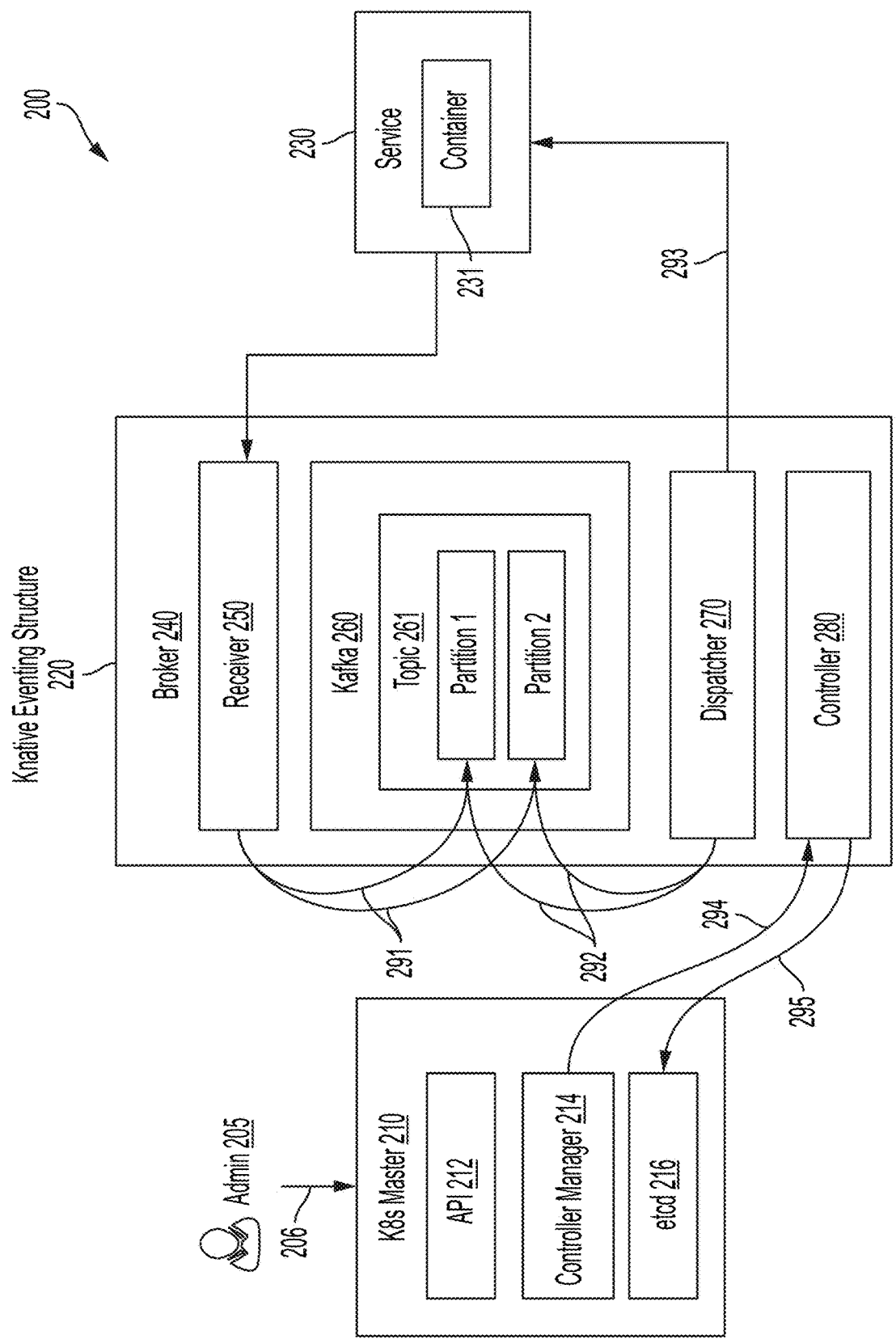
FIG. 2 depicts an architecture for Knative eventing, in accordance with the prior art.
Figure 3:
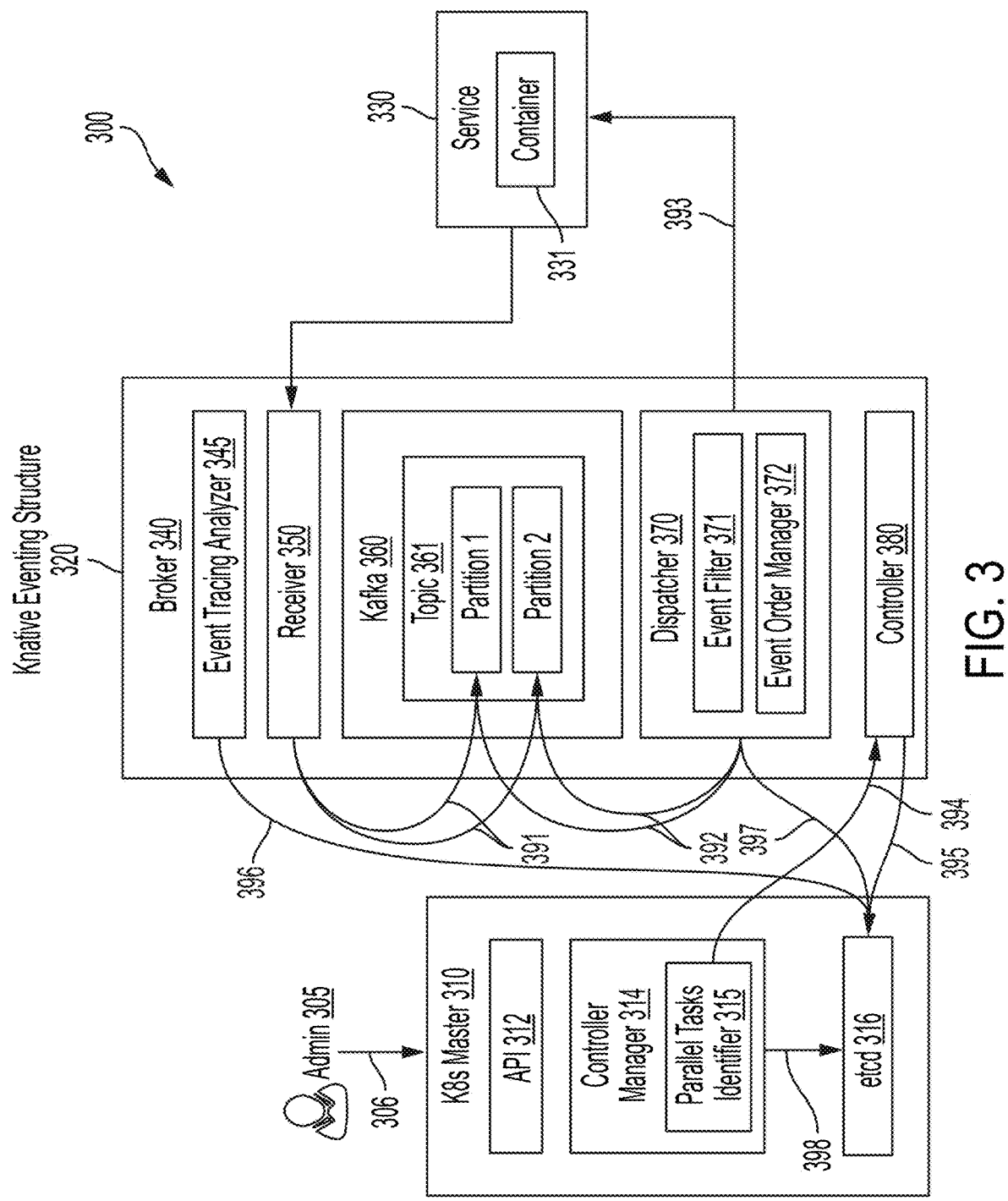
FIG. 3 depicts an architecture for Knative eventing, in accordance with embodiments of the present invention.

FIG. 3 depicts an architecture 300 for Knative eventing, in accordance with embodiments of the present invention.

The architecture 300 comprises Administrator ("Admin") 305, a K8s master 310, a Knative eventing structure 320, and a service 330.

The admin 305 interacts 306 with the K8s master 310 to deploy a process.

The K8s master 310 includes an application programming interface (API) 312, a controller manager 314, and an etcd 316. The controller manager 314 includes a parallel tasks identifier (Id) 315.

The Knative eventing structure 320 includes a broker 340.

The broker 340 includes an event tracing analyzer 345, a receiver 350, a Kafka event streaming platform 360, a dispatcher 370, and a controller 380.

The Kafka event streaming platform 360 includes a topic 361 organized into partitions. Although only two partitions (partition 1 and partition 2) are shown explicitly in FIG. 3, the partitions 1 and partition 2 collectively represent a plurality of partitions (e.g., 2 partitions, 3 partitions, 4 partitions, etc.).

The dispatcher 370 includes an event filter 371 and an event order manager (EOM) 372.

The service 330 may include a container 331 that packages runtime code for processing the events (messages) received from the dispatcher 370 of the broker 340.

The words "event" and "message" have the same meaning and are interchangeable.

In one embodiment, one or more messages of the messages received by the container 331 trigger execution of services by the container 331 based on content in the one or more messages and/or in dependence on the executed tasks to which the one or more tasks are associated, the executed tasks having been previously received and placed in the plurality of partitions by the broker 340.

In the broker 340, the receiver 350 receives the stream of events and distributes 391 the events (messages) into the plurality of partitions represented by partitions 1 and 2, wherein each message is placed in only one partition of the plurality of partitions. For each message, a Kafka protocol determines into which partition each message is placed. The dispatcher 370 extracts the events from the plurality of partitions and then dispatches 393 the messages to the service 330 under control of the controller 380.

In the service 330, the runtime code in the container 331 processes the messages received from the dispatcher 370.

In the K8s master 310: (i) the etcd 316 stores parameters (e.g., configuration data, state data, metadata, etc.) pertinent to the Knative Eventing structure 320, wherein the parameters may be received 395 by the etcd 316 from the controller 380; (ii) the controller manager 314 manages and coordinates the K8s master and provides 394 to the controller 380 constraints pertaining to dispatching the events to the service 330; and (iii) the API 312 provides a programming interface between the K8s master 310 and worker nodes or external nodes (e.g., servers, virtual machines, etc.).

Figure 4:
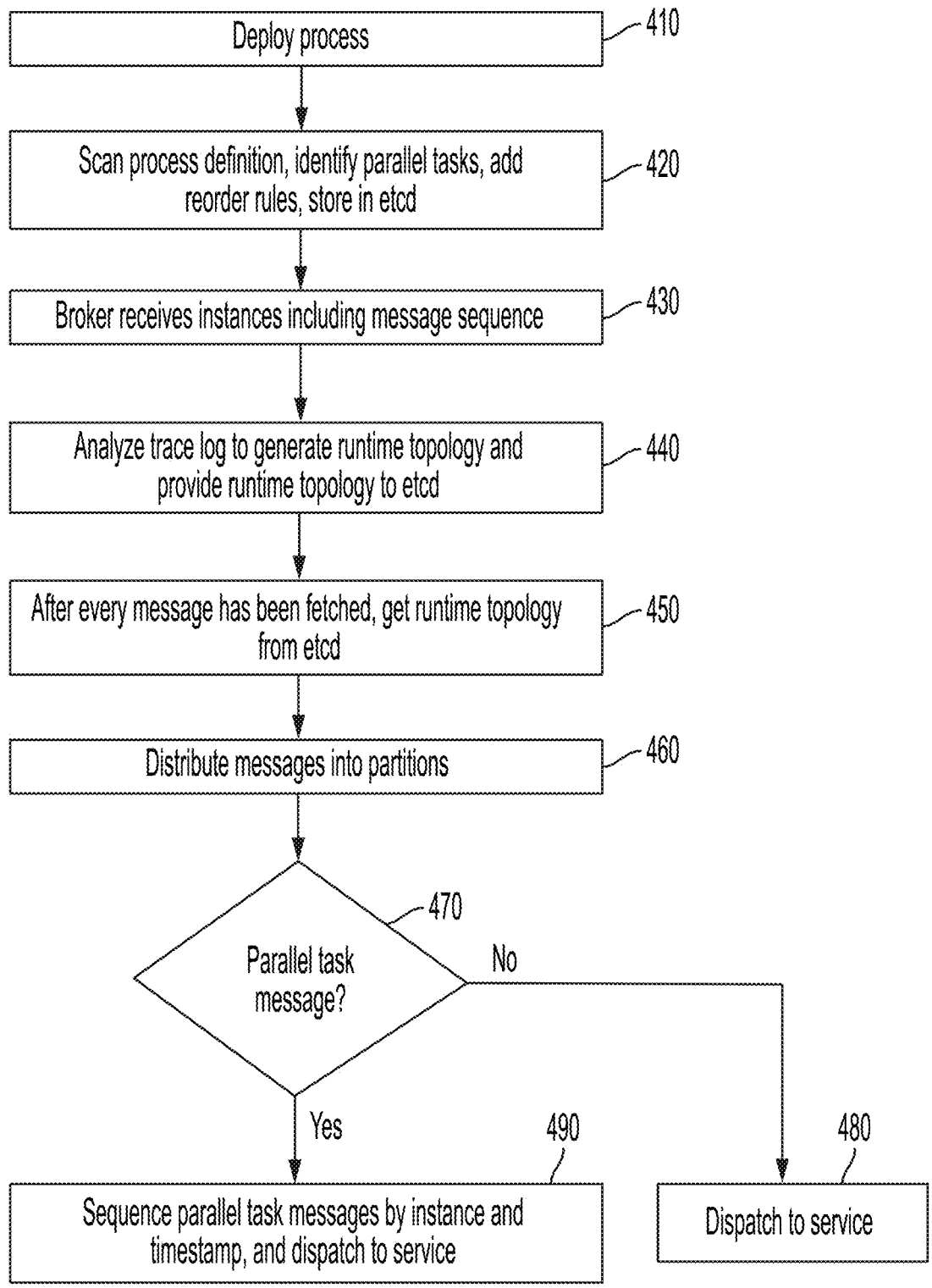
FIG. 4 is a flow chart describing a method for processing a stream of messages, in accordance with embodiments of the present invention.

FIG. 4 is a flow chart describing a method for processing a stream of messages, in accordance with embodiments of the present invention. The method of FIG. 4 implements a process in which instances of sequences of messages associated with tasks are handled. For each instance, one task is performed or a plurality of tasks are performed in parallel. After each task has been completed, a message pertaining to the completed task is sent to the broker and are eventually dispatched to the container according to a FIFO requirement for parallel task messages.

The method of FIG. 4 includes steps 410-490 which utilize the architecture 300 of FIG. 3.

In step 410, the admin 305 deploys a process performed on multiple instances of streamed messages. In each instance, either one task is performed or a plurality of tasks are performed in parallel. After each task has been completed, a message pertaining to the completed task is sent to the broker.

In step 420, the parallel tasks identifier 315 scans a process definition of the process, identifies parallel tasks, adds reorder rules and transmits 398 the process definition, the identification of the parallel tasks, and the recorder rules to etcd 316 for storage by etcd 316 in a data store.

In step 430, the broker 340 receives a plurality of instances including messages pertaining to tasks, wherein the tasks may include services. \

Each instance received by the broker 340 has an instance number and an associated instance Id. Each instance comprises a stream of one or more messages, wherein each message in each stream is associated with a respective task. The one or more messages in the stream in each instance of at least two instances of the plurality of instances consists of a plurality of messages whose respective tasks have been completed and were executed in parallel.

In step 440, the event tracing analyzer 345 analyzes a trace log pertaining to incoming instances of messages received by the broker 340 to generate a runtime topology and provides 396 the generated runtime topology to the etcd 316.

In step 450 after every message has been fetched from a stream of messages, the event filter 371 receives the runtime topology from the etcd 316.

In step 460, all messages whose respective tasks have been completed are distributed 391 into the plurality of partitions. A Kafka protocol determines into which partition each message is placed.

In step 460, different messages in each instance of at least one instance of the at least two instances are distributed into different partitions of the plurality of partitions. The messages distributed in the plurality of partitions comprise a plurality of parallel task messages.

A parallel task message is defined as an individual message whose respective task is performed in parallel with at least one other task whose associated message is in the same instance as the individual message. For example in instance 2 of FIGS. 7 and 8, the three messages whose respective tasks are B1, B2 and B3 are each a parallel task message because the respective tasks B1, B2 and B3 in the same instance 2 are performed in parallel.

Although FIG. 4 shows step 460 being performed after the runtime topology steps 440 and 450 are performed, step 460 may alternatively be performed before steps 440 and 450 are performed and after step 430 is performed.

In step 470, the event filter 371 determine whether the message is a parallel task message.

If step 470 determines that the message is not a parallel task message (No branch from step 470) then in step 480, the dispatcher 370 fetches 392 the message from the plurality of partitions and dispatches 393 the message directly to the service 330.

If step 470 determines that the message is a parallel task message (Yes branch from step 470) then the parallel task message is sent to the event order manager 372 to perform step 490.

In step 490 which process all of the parallel task messages collectively, the parallel task messages are sequenced by instance and timestamp such that that the parallel task messages are grouped by the instance number or instance Id and are sequentially ordered in each group in an ascending order of a timestamp of arrival of each parallel task message at the broker.

In one embodiment of step 490, the event order manager 372 groups and reorders the parallel task messages within the plurality of partitions 392, the grouping being by instance and the reordering being by timestamp, and then fetches the reordered parallel task messages from the plurality of partitions.

In a second embodiment of step 490, the event order manager 372 fetches the parallel task messages from the plurality of partitions, and then groups and reorders the parallel task messages, the grouping being by instance or instance Id and the reordering being by timestamp.

In step 490, the dispatcher 370 dispatches 393 the reordered messages to the service 330 in a time sequence governed by the sequential ordering of the parallel task messages in each group, which dispatches the messages according to a FIFO requirement.

Figure 5A:
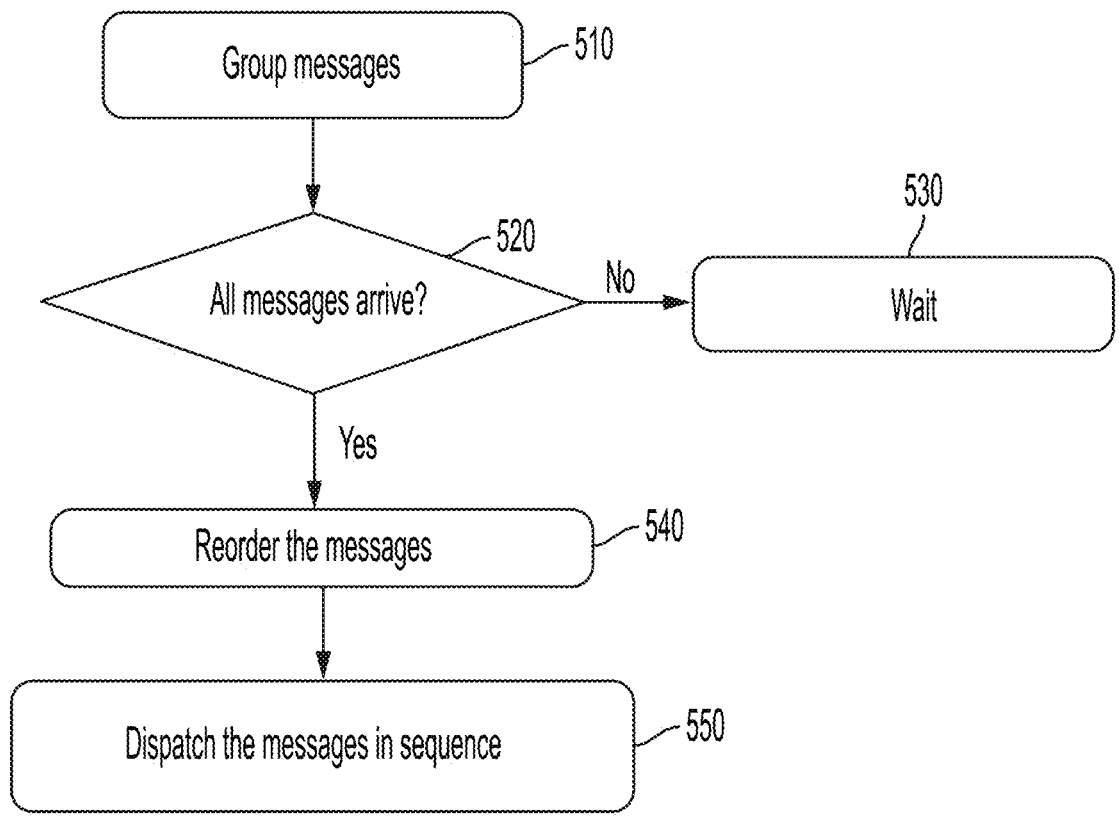
FIG. 5A is a flow chart describing a first embodiment of a step in FIG. 4 that groups the messages by instance or instance Id, reorders the regrouped messages of each instance by timestamp, and sends the reordered messages of each to a service, in accordance with embodiments of the present invention.

FIG. 5A is a flow chart describing a first embodiment of step 490 in FIG. 4 that groups the parallel task messages by instance or instance Id, reorders the regrouped parallel task messages of each instance by timestamp, and sends the reordered parallel task messages of each group to the service 330, in accordance with embodiments of the present invention. The flow chart of FIG. 5A includes steps 510-550.

In step 510, the event order manager 372 groups the parallel task messages by instance or instance Id. The grouping step 510 does not attempt to sequence the parallel task messages within each instance in any specified order and in one embodiment sequences the parallel task messages randomly within each instance.

In step 520 for each instance, the event order manager 372 determines whether all parallel task messages of the instance have arrived in the plurality of partitions. Parallel task messages of tasks that have not yet been completed have not yet arrived in the plurality of partitions.

If step 520 determines that all parallel task messages of the instance have arrived in the plurality of partitions (Yes branch from step 520) then in step 540, the event order manager 372 reorders the parallel task messages of the instance by timestamp, and then in step 550 the dispatcher 370 dispatches the reordered parallel task messages of the instance to the service 330 in a time sequence corresponding to the reordered parallel task messages.

If step 520 determines that all parallel task messages of the instance have not arrived in the plurality of partitions (No branch from step 520) then in step 530, the event order manager 372 waits for all parallel task messages to arrive before executing the reordering step 540 and the dispatching step 550.

Figure 5B:
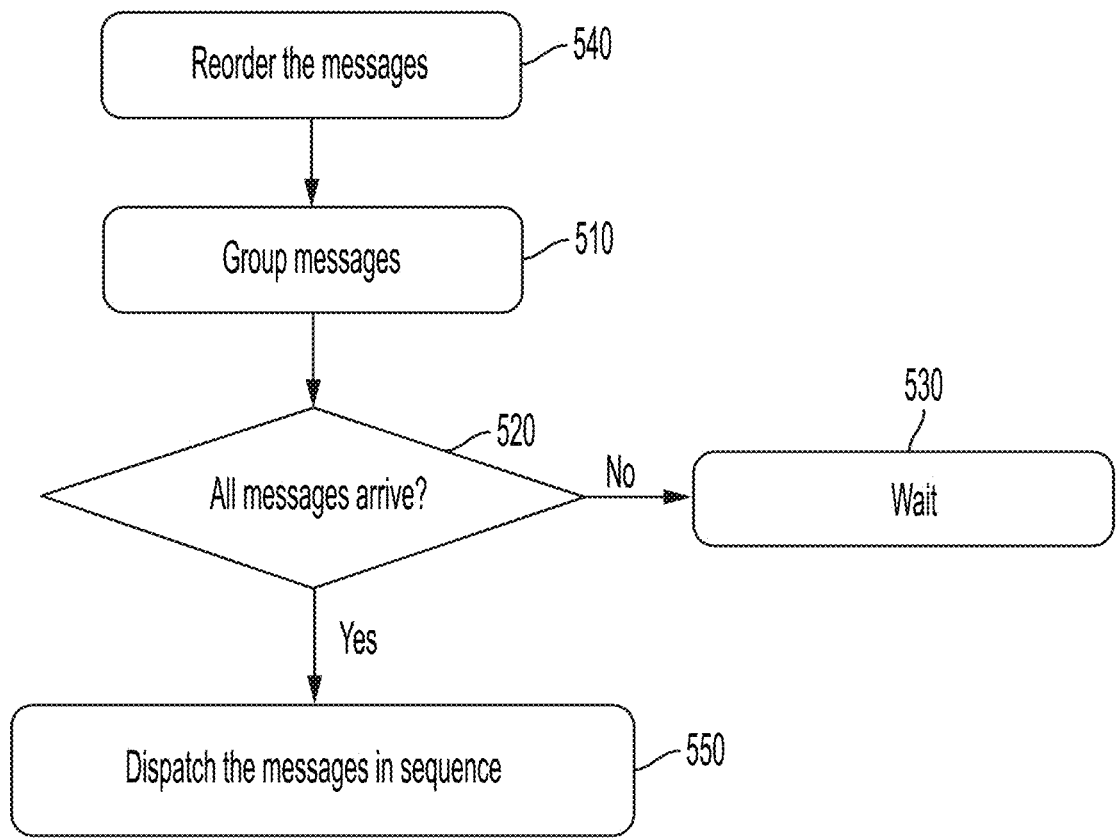
FIG. 5B is a flow chart describing a second embodiment of a step in FIG. 4 that reorders the messages by timestamp, groups the reordered messages by instance or instance Id, and sends the reordered messages of each group to a service, in accordance with embodiments of the present invention.

FIG. 5B is a flow chart describing a second embodiment of step 490 in FIG. 4 that reorders the parallel task messages by timestamp, groups the parallel task reordered messages by instance or instance Id, and sends the reordered parallel task messages of each group to the service 330, in accordance with embodiments of the present invention. The flow chart of FIG. 5B includes steps 510-550.

In the first embodiment of FIG. 5A, the reordering step 540 is performed after the grouping step 510 is performed.

In the second embodiment of FIG. 5B, the reordering step 540 is performed before the grouping step 510 is performed.

In step 540, the event order manager 372 reorders all of the parallel task messages by timestamp.

In step 510, the event order manager 372 groups the reordered parallel task messages by instance or instance Id while maintaining the timestamp reordering performed in step 540.

In step 520 for each instance, the event order manager 372 determines whether all parallel task messages of the instance have arrived in the plurality of partitions. Parallel task messages of tasks that have not yet been completed have not yet arrived in the plurality of partitions.

If step 520 determines that all parallel task messages of the instance have arrived in the plurality of partitions (Yes branch from step 520) then in step 550 the dispatcher 370 dispatches the reordered parallel task messages of each instance to the service 330 in a time sequence corresponding to the reordered parallel task messages.

If step 520 determines that all parallel task messages of the instance have not arrived in the plurality of partitions (No branch from step 520) then in step 530, the event order manager 372 waits for all parallel task messages to arrive before executing the dispatching step 550.

Figure 6:
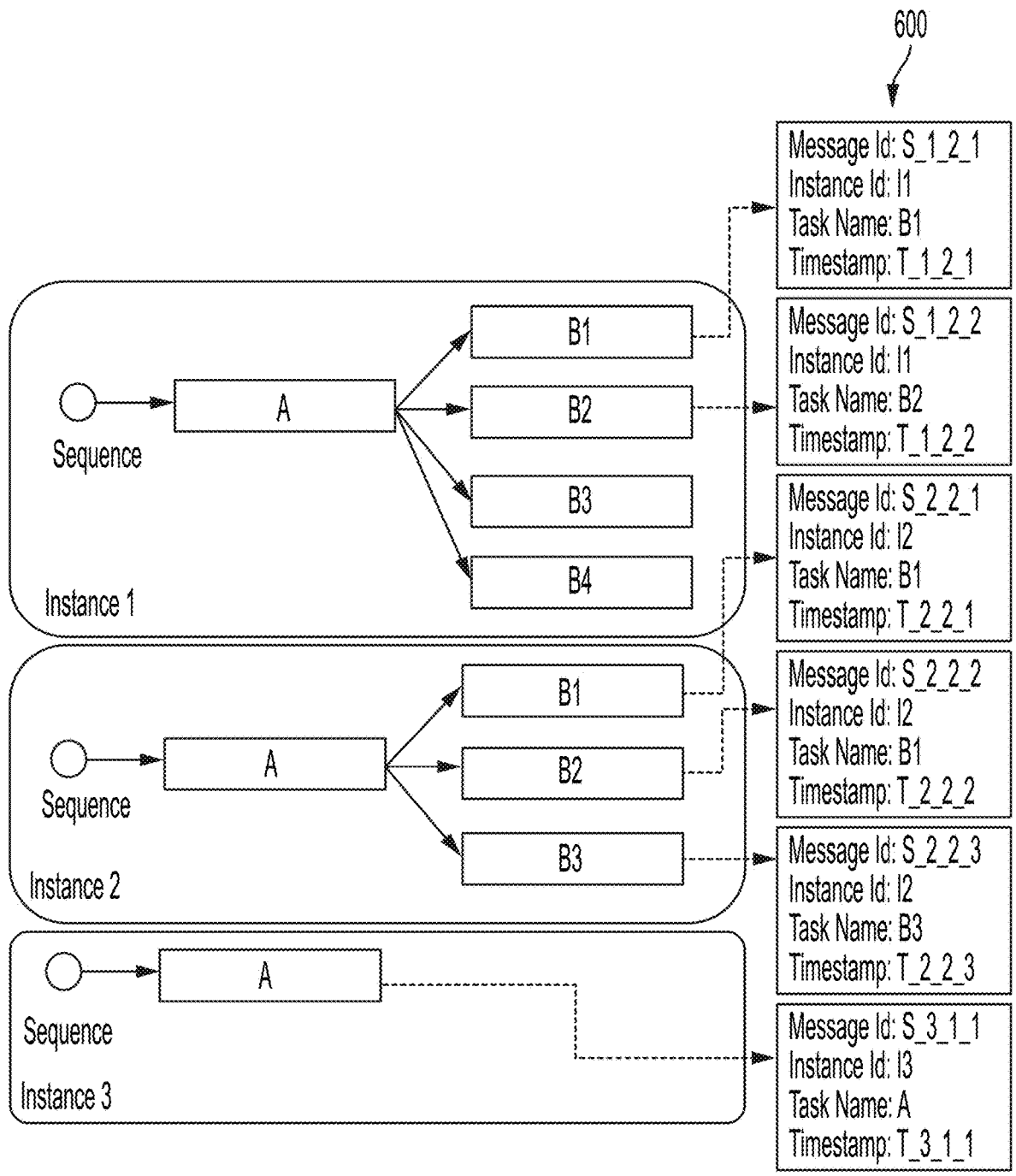
FIG. 6 depicts three instances of tasks and associated messages for an illustrative example, in accordance with embodiments of the present invention.
Figure 7:
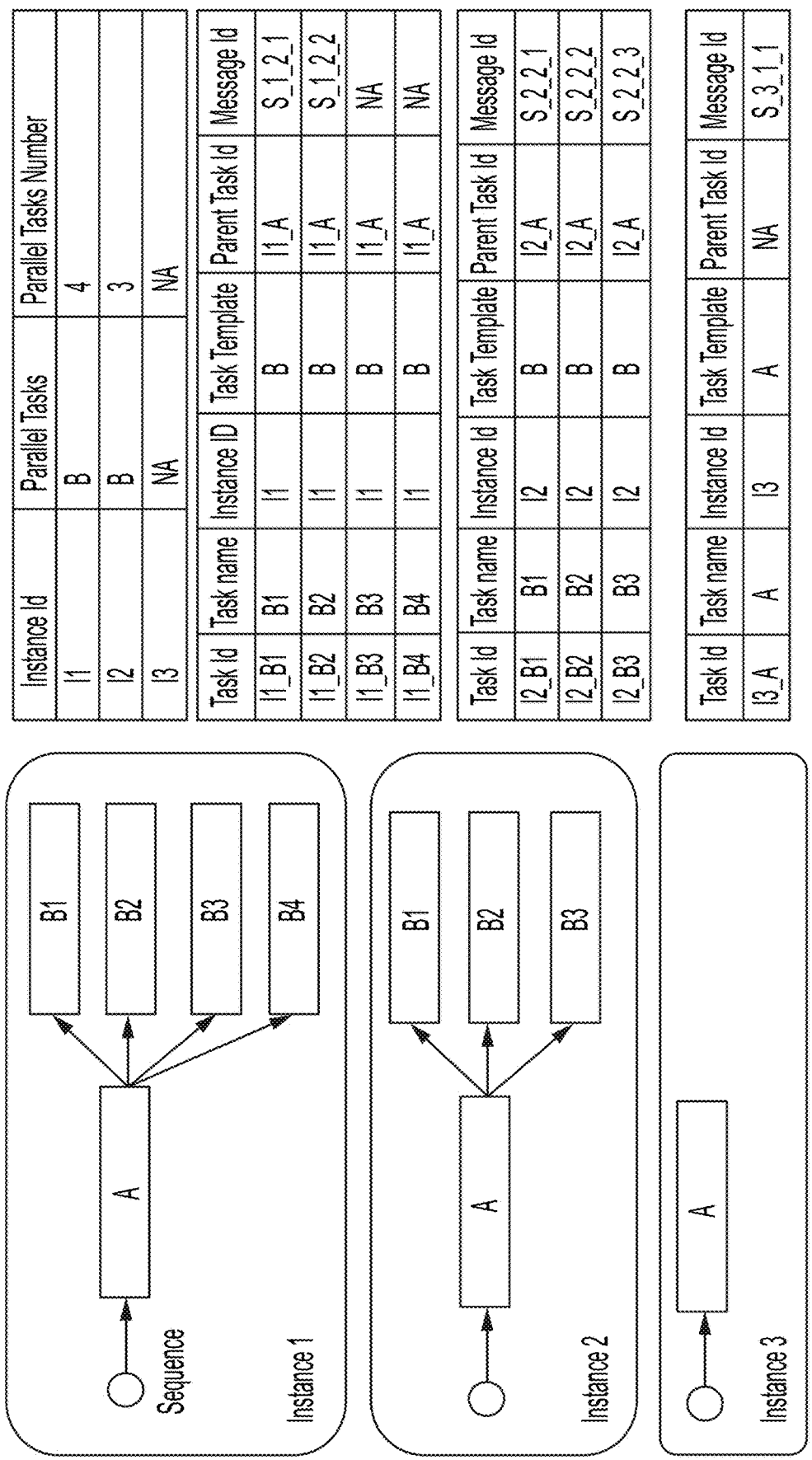
FIG. 7 depicts a runtime topology pertaining to the three instances depicted in FIG. 6, in accordance with embodiments of the present invention.

The following example illustrates the method described by FIGS. 4 and 5A, with assistance from FIGS. 6 and 7 and Tables 2-6.

FIG. 6 depicts three instances of tasks and associated messages for an illustrative example, in accordance with embodiments of the present invention.

In FIG. 6, the instance Id is of a form Ii where i denotes instance number. For example, I1 is an instance Id of instance 1, and I2 is an instance Id of instance 2.

FIG. 6 depicts three instances (i.e., instances 1, 2, 3 having an instance Id of I1, I2, I3, respectively) of tasks and associated messages 600, in accordance with embodiments of the present invention. The process deployed in step 410 of FIG. 4 is performed on the three instances 1, 2, and 3.

The timestamps in messages 600 have a form of $T\_i\_j\_k$, wherein i denotes an instance number, j is 2 if tasks are running in parallel in instance i and is 1 otherwise, and k is a chronological time index such that $T\_i\_j\_k2$ is later in time than $T\_i\_j\_k1$ if $k2 > k1$.

Instance 1 is a sequence of a parent task A and 4 child tasks (B1, B2, B3, B4) of parent task A which was previously completed and dispatched to the service. The 4 child tasks of instance 1 are performed in parallel. Tasks B1 and B2 of instance 1 have been completed, so the respective messages pertaining to tasks B1 and B2 of instance 1 are sent by the broker 340 to the plurality of partitions. Tasks B3 and B4 of instance 1 have not been completed, so messages associated with tasks B3 and B4 of instance 1 will not be sent by the broker 340 to the plurality of partitions until tasks B3 and B4 of instance 1 have been completed, which is why messages pertaining to instances B3 and B4 of instance 1 are not shown in FIG. 6.

Instance 2 is a sequence of a parent task A and 3 child tasks (B1, B2, B3) of parent task A which was previously completed and discharged to the service. The 3 child tasks of instance 2 are performed in parallel. Tasks B1, B2 and B3 of instance 2 have been completed, so the respective messages pertaining to tasks B1 and B2 of instance 2 are sent by the broker 340 to the plurality of partitions.

Instance 3 is a single task A which has been completed, so a message pertaining to task A of instance 3 is sent by the broker 340 to the plurality of partitions.

FIG. 7 depicts a runtime topology pertaining to the three instances depicted in FIG. 6, in accordance with embodiments of the present invention. The runtime topology depicted in FIG. 7 results from execution of step 440 in FIG. 4 in which the runtime topology is generated.

It is noted that a Task Id appears in FIG. 7 as combination of instance Id and task name. For example, the task Id of I2_B1 denotes a combination of instance Id I2 and task name B1 in instance 2.

The runtime topology specifies that the B tasks (B1, B2, B3, B4) in instance 1 are executed in parallel, the B tasks (B1, B2, B3) in instance 2 are executed in parallel, and that A task in instance 3 is a single task.

Table 2 shows how the messages are distributed in partitions 1 and 2 in step 460 of FIG. 4.

TABLE 2

Messages In Partitions

| Message Id | Instance Id | Task Name | Timestamp | Partition Id |
|---|---|---|---|---|
| S_3_1_1 | I3 | A | T_3_1_1 | P1 |
| S_2_2_1 | I2 | B1 | T_2_2_1 | P1 |
| S_2_2_2 | I2 | B2 | T_2_2_2 | P1 |
| S_1_2_1 | I1 | B1 | T_1_2_1 | P1 |
| S_2_2_3 | I2 | B3 | T_2_2_3 | P2 |
| S_1_2_2 | I1 | B2 | T_1_2_2 | P2 |

In Table 2, the partition Id is of a form Pp where p denotes a partition number. For example, P1 is a partition Id of partition 1, and P2 is a partition Id of partition 2. A Kafka protocol determines into which partition each message is placed.

Table 3 results from message S_3_1_1 of task A having been removed from partition 1 and dispatched to service 330, because message S_3_1_1 is not a parallel task message (No branch from step 470 of FIG. 4).

TABLE 3

Messages To Be Grouped and Reordered

| Message Id | Instance Id | Task Name | Timestamp | Partition Id |
|---|---|---|---|---|
| S_2_2_1 | I2 | B1 | T_2_2_1 | P1 |
| S_2_2_2 | I2 | B2 | T_2_2_2 | P1 |
| S_1_2_1 | I1 | B1 | T_1_2_1 | P1 |
| S_2_2_3 | I2 | B3 | T_2_2_3 | P2 |
| S_1_2_2 | I1 | B2 | T_1_2_2 | P2 |

The messages in Table 3 are parallel task messages which will sequenced by being grouped and reordered in accordance with step 490 of FIG. 4 as implemented in accordance with the flow chart of FIG. 5A.

Table 4 groups the messages in Table 3 by instance or instance Id, in accordance with step 510 of FIG. 5A.

TABLE 4

Messages Grouped By Instance or Instance Id

| Message Id | Instance Id | Task Name | Timestamp | Partition Id |
|---|---|---|---|---|
| S_1_2_2 | I1 | B2 | T_1_2_2 | P2 |
| S_1_2_1 | I1 | B1 | T_1_2_1 | P1 |

TABLE 4-continued

Messages Grouped By Instance or Instance Id

| Message Id | Instance Id | Task Name | Timestamp | Partition Id |
|---|---|---|---|---|
| S_2_2_3 | I2 | B3 | T_2_2_3 | P2 |
| S_2_2_1 | I2 | B1 | T_2_2_1 | P1 |
| S_2_2_2 | I2 | B2 | T_2_2_2 | P1 |

The grouping step 510 does not attempt to order the messages within each instance in any specified order and in one embodiment orders the messages randomly within each instance.

Table 5 results from the messages in instance 1 in Table 4 being removed and placed in a "wait" status, because all messages in instance 1 have not arrived in the plurality of partitions, which implements steps 520 and 530 of FIG. 5A. As discussed supra, tasks B3 and B4 of instance 1 have not been completed and therefore have not arrived in the plurality of partitions.

TABLE 5

Messages Grouped By Instance Without Messages of Instance 1

| Message Id | Instance Id | Task Name | Timestamp | Partition Id |
|---|---|---|---|---|
| S_2_2_3 | I2 | B3 | T_2_2_3 | P2 |
| S_2_2_1 | I2 | B1 | T_2_2_1 | P1 |
| S_2_2_2 | I2 | B2 | T_2_2_2 | P1 |

Table 6 reorders the messages in Table 5 by timestamp, which implements step 540 of FIG. 5A.

TABLE 6

Messages Reordered By Timestamp

| Message Id | Instance Id | Task Name | Timestamp | Partition Id |
|---|---|---|---|---|
| S_2_2_1 | I2 | B1 | T_2_2_1 | P1 |
| S_2_2_2 | I2 | B2 | T_2_2_2 | P1 |
| S_2_2_3 | I2 | B3 | T_2_2_3 | P2 |

The three messages in instance 2 in Table 6 are next dispatched by the dispatcher 370 to the service 330 in a time sequence corresponding to the reordered messages, which implements step 550 of FIG. 5A.

Figure 8:
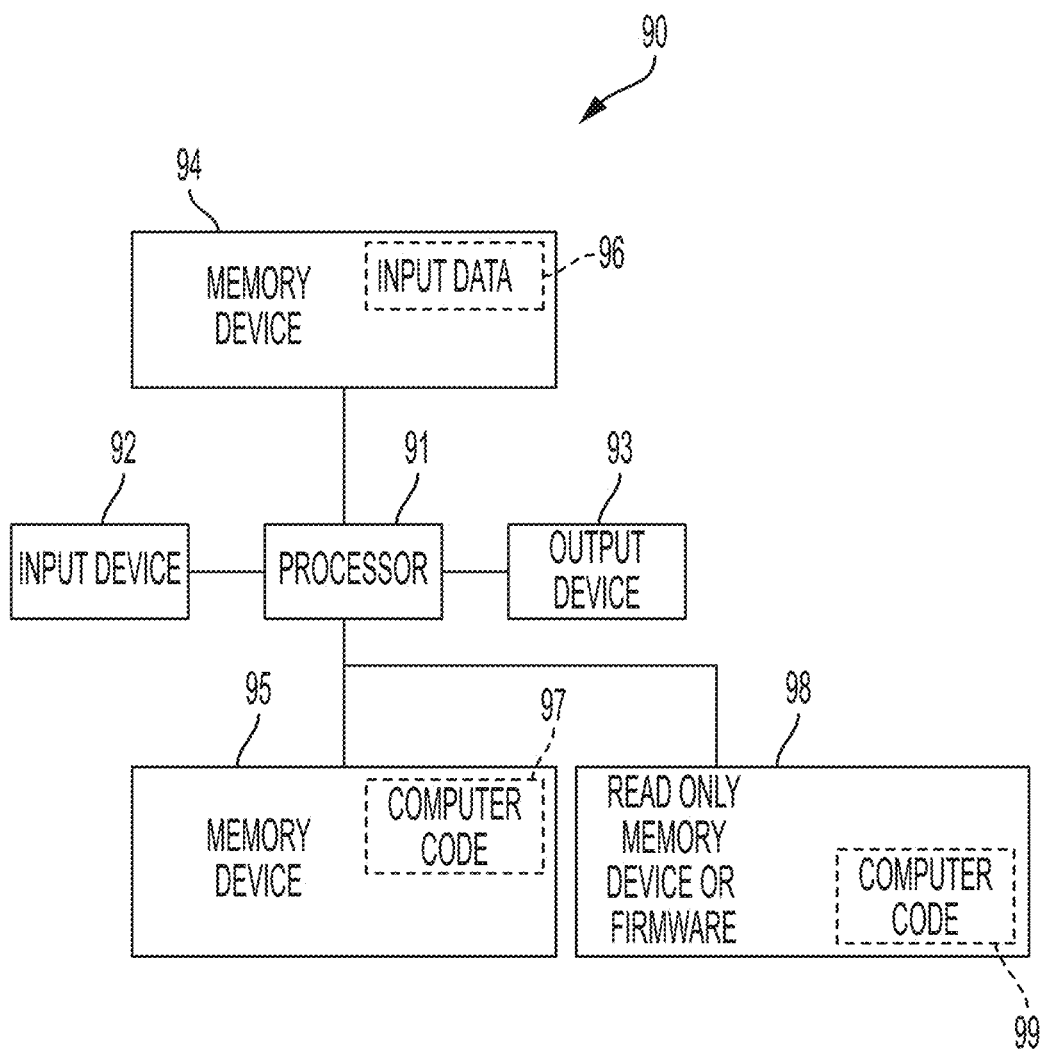
FIG. 8 illustrates a computer system, in accordance with embodiments of the present invention.

FIG. 8 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 98 (e.g., including algorithms) may be stored on a static, nonremovable, read-only storage medium such as a Read-Only Memory (ROM) device 99, or may be accessed by processor 91 directly from such a static, nonremovable, read-only medium 99. Similarly, in some embodiments, stored computer program code 97 may be stored as computer-readable firmware 99, or may be accessed by processor 91 directly from such firmware 99, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
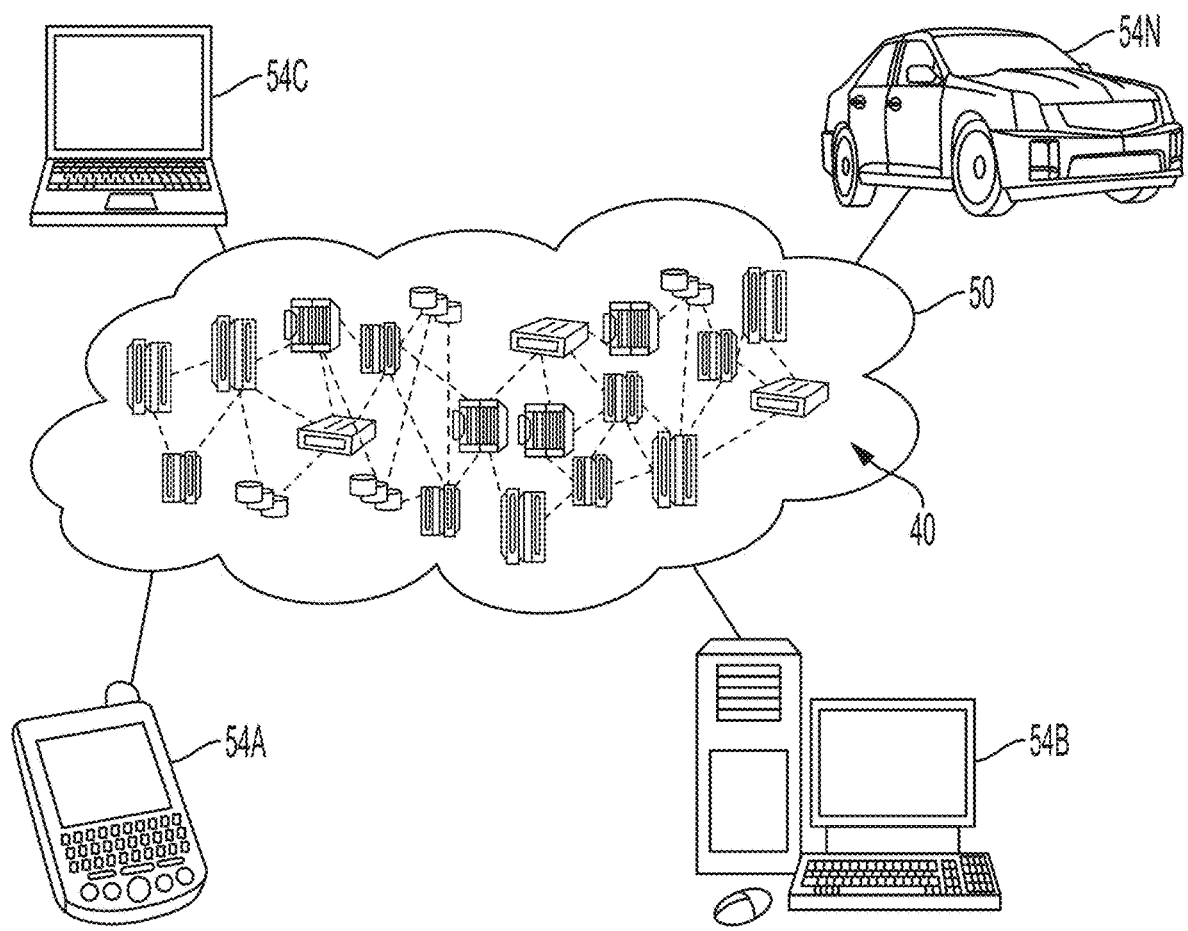
FIG. 9 depicts a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
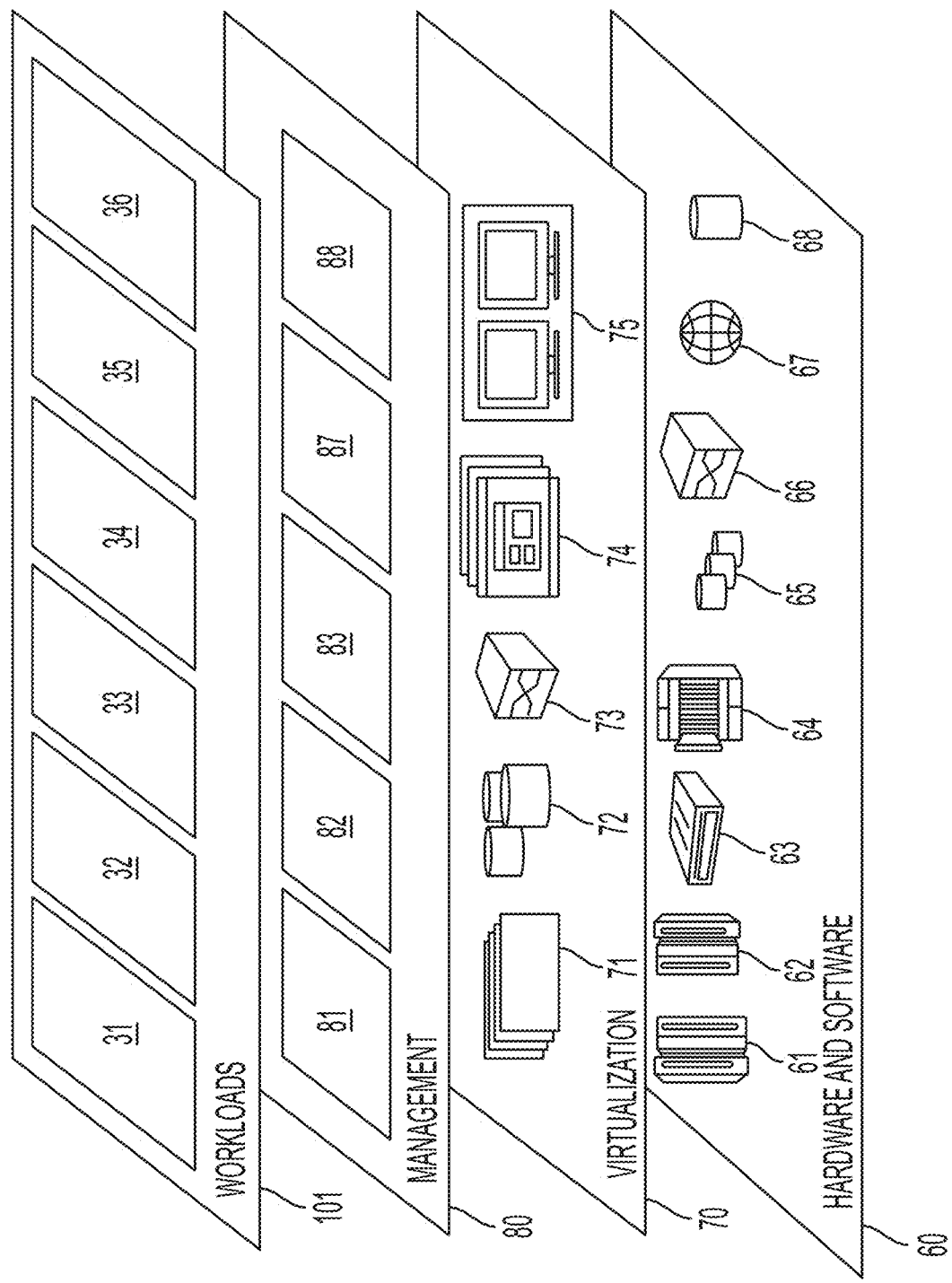
FIG. 10 depicts abstraction model layers, in accordance with embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 30 provides examples of functionality for which the cloud computing environment may be utilized. Examples of workloads and functions which may be provided from this layer include: mapping and navigation 31; software development and lifecycle management 32; virtual classroom education delivery 33; data analytics processing 34; transaction processing 35; and processing instances of message sequences 36.

Examples and embodiments of the present invention described herein have been presented for illustrative purposes and should not be construed to be exhaustive. While embodiments of the present invention have been described herein for purposes of illustration, many modifications and changes will become apparent to those skilled in the art. The description of the present invention herein explains the principles underlying these examples and embodiments, in order to illustrate practical applications and technical improvements of the present invention over known technologies, computer systems, and/or products.

What is claimed is:

1. A method for processing instances of message sequences, said method comprising:

receiving, by one or more processors of a broker within a Knative eventing structure, a plurality of instances, wherein each instance has an instance number and an associated instance Id, wherein each instance comprises a stream of one or more messages, wherein each message in each stream is associated with a respective task, wherein the one or more messages in the stream in each instance of at least two instances of the plurality of instances consists of a plurality of messages whose respective tasks have been completed and were executed in parallel, and wherein the broker comprises a Kafka event streaming platform that includes a plurality of partitions;

distributing, by the one or more processors into the plurality of partitions, all messages in the plurality of instances whose respective tasks have been completed, wherein different messages in each instance of at least one instance of the at least two instances are distributed into different partitions of the plurality of partitions, and wherein the messages distributed in the plurality of partitions comprise a plurality of parallel task messages;

sequencing, by the one or more processors, the parallel task messages by having the parallel task messages grouped by the instance number or instance Id and sequentially ordered in each group in an ascending order of a timestamp of arrival of each parallel task message at the broker; and dispatching, by the one or more processors, the parallel task messages in each instance to a service in a time sequence governed by the sequential ordering of the parallel task messages in each group, which dispatches the parallel task messages according to a first in, first out (FIFO) requirement.

2. The method of claim 1, wherein said sequencing comprises grouping the parallel task messages by the instance number or instance Id, followed by reordering the parallel task messages in each group by the timestamp of arrival of each parallel task message at the broker.

3. The method of claim 1, wherein said sequencing comprises reordering the parallel task messages by the timestamp of arrival of each parallel task message at the broker, followed by grouping the reordered messages by instance or instance Id while maintaining the timestamp reordering.

4. The method of claim 1, wherein the method further comprises:

determining, by the one or more processors, that one message in the plurality of partitions is not a parallel task message and in response, dispatching, by the one or more processors, the one message to the service.

5. The method of claim 1, wherein the plurality of instances comprises one instance that includes two or more parallel task messages that have arrived at the plurality of partitions and at least one parallel task message that has not yet arrived at the plurality of partitions, and wherein the method further comprises:

waiting, by a the one or more processors, for the at least one parallel task message to be completed and arrive at the plurality of partitions before performing said sequencing and said dispatching for the one instance.

6. The method of claim 1, wherein the method further comprises:

analyzing, by an event tracing analyzer in the broker using the one or more processors, a trace log pertaining to the plurality of instances received by the broker;

generating based on said analyzing, by the event tracing analyzer using the one or more processors, a runtime topology pertaining to the plurality of instances; and providing, by the event tracing analyzer using the one or more processors, the generated runtime topology to an etcd in a K8s master.

7. The method of claim 6, wherein the method further comprises:

after every message has been fetched from a stream of messages, receiving, by an event filter in the broker using the one or more processors, the runtime topology from the etcd to determine whether the fetched message is a parallel task message.

8. A computer program product, comprising one or more computer readable hardware storage devices having computer readable program code stored therein, said program code containing instructions executable by one or more processors of a computer system to implement a method for processing instances of message sequences, said method comprising:

receiving, by the one or more processors of a broker within a Knative eventing structure, a plurality of instances, wherein each instance has an instance number and an associated instance Id, wherein each instance comprises a stream of one or more messages, wherein each message in each stream is associated with a respective task, wherein the one or more messages in the stream in each instance of at least two instances of the plurality of instances consists of a plurality of messages whose respective tasks have been completed and were executed in parallel, and wherein the broker comprises a Kafka event streaming platform that includes a plurality of partitions;

distributing, by the one or more processors into the plurality of partitions, all messages in the plurality of instances whose respective tasks have been completed, wherein different messages in each instance of at least one instance of the at least two instances are distributed into different partitions of the plurality of partitions, and wherein the messages distributed in the plurality of partitions comprise a plurality of parallel task messages;

sequencing, by the one or more processors, the parallel task messages by having the parallel task messages grouped by the instance number or instance Id and sequentially ordered in each group in an ascending order of a timestamp of arrival of each parallel task message at the broker; and dispatching, by the one or more processors, the parallel task messages in each instance to a service in a time sequence governed by the sequential ordering of the parallel task messages in each group, which dispatches the parallel task messages according to a first in, first out (FIFO) requirement.

9. The computer program product of claim 8, wherein said sequencing comprises grouping the parallel task messages by the instance number or instance Id, followed by reordering the parallel task messages in each group by the timestamp of arrival of each parallel task message at the broker.

10. The computer program product of claim 8, wherein said sequencing comprises reordering the parallel task messages by the timestamp of arrival of each parallel task message at the broker, followed by grouping the reordered messages by instance or instance Id while maintaining the timestamp reordering.

11. The computer program product of claim 8, wherein the method further comprises:

determining, by the one or more processors, that one message in the plurality of partitions is not a parallel task message and in response, dispatching, by the one or more processors, the one message to the service.

12. The computer program product of claim 8, wherein the plurality of instances comprises one instance that includes two or more parallel task messages that have arrived at the plurality of partitions and at least one parallel task message that has not yet arrived at the plurality of partitions, and wherein the method further comprises:

waiting, by a the one or more processors, for the at least one parallel task message to be completed and arrive at the plurality of partitions before performing said sequencing and said dispatching for the one instance.

13. The computer program product of claim 8, wherein the method further comprises:

analyzing, by an event tracing analyzer in the broker using the one or more processors, a trace log pertaining to the plurality of instances received by the broker;

generating based on said analyzing, by the event tracing analyzer using the one or more processors, a runtime topology pertaining to the plurality of instances; and providing, by the event tracing analyzer using the one or more processors, the generated runtime topology to an etcd in a K8s master.

14. The computer program product of claim 13, wherein the method further comprises:

after every message has been fetched from a stream of messages, receiving, by an event filter in the broker using the one or more processors, the runtime topology from the etcd to determine whether the fetched message is a parallel task message.

15. A computer system, comprising one or more processors, one or more memories, and one or more computer readable hardware storage devices, said one or more hardware storage devices containing program code executable by the one or more processors via the one or more memories to implement a method for processing instances of message sequences, said method comprising:

receiving, by the one or more processors of a broker within a Knative eventing structure, a plurality of instances, wherein each instance has an instance number and an associated instance Id, wherein each instance comprises a stream of one or more messages, wherein each message in each stream is associated with a respective task, wherein the one or more messages in the stream in each instance of at least two instances of the plurality of instances consists of a plurality of messages whose respective tasks have been completed and were executed in parallel, and wherein the broker comprises a Kafka event streaming platform that includes a plurality of partitions;

distributing, by the one or more processors into the plurality of partitions, all messages in the plurality of instances whose respective tasks have been completed, wherein different messages in each instance of at least one instance of the at least two instances are distributed into different partitions of the plurality of partitions, and wherein the messages distributed in the plurality of partitions comprise a plurality of parallel task messages;

sequencing, by the one or more processors, the parallel task messages by having the parallel task messages grouped by the instance number or instance Id and sequentially ordered in each group in an ascending order of a timestamp of arrival of each parallel task message at the broker; and dispatching, by the one or more processors, the parallel task messages in each instance to a service in a time sequence governed by the sequential ordering of the parallel task messages in each group, which dispatches the parallel task messages according to a first in, first out (FIFO) requirement.

16. The computer system of claim 15, wherein said sequencing comprises grouping the parallel task messages by the instance number or instance Id, followed by reordering the parallel task messages in each group by the timestamp of arrival of each parallel task message at the broker.

17. The computer system of claim 15, wherein said sequencing comprises reordering the parallel task messages by the timestamp of arrival of each parallel task message at the broker, followed by grouping the reordered messages by instance or instance Id while maintaining the timestamp reordering.

18. The computer system of claim 15, wherein the method further comprises:
   determining, by the one or more processors, that one message in the plurality of partitions is not a parallel task message and in response, dispatching, by the one or more processors, the one message to the service.

19. The computer system of claim 15, wherein the plurality of instances comprises one instance that includes two or more parallel task messages that have arrived at the plurality of partitions and at least one parallel task message that has not yet arrived at the plurality of partitions, and wherein the method further comprises:
   waiting, by a the one or more processors, for the at least one parallel task message to be completed and arrive at the plurality of partitions before performing said sequencing and said dispatching for the one instance.

20. The computer system of claim 15, wherein the method further comprises:
   analyzing, by an event tracing analyzer in the broker using the one or more processors, a trace log pertaining to the plurality of instances received by the broker;
   generating based on said analyzing, by the event tracing analyzer using the one or more processors, a runtime topology pertaining to the plurality of instances; and
   providing, by the event tracing analyzer using the one or more processors, the generated runtime topology to an etcd in a K8s master.

* * * * *